(12) United States Patent
Zhai et al.

(10) Patent No.: US 11,080,539 B2
(45) Date of Patent: Aug. 3, 2021

(54) TRAFFIC LIGHT STATE RECOGNIZING METHOD AND APPARATUS, COMPUTER DEVICE AND READABLE MEDIUM

(71) Applicant: BAIDU ONLINE NETWORK TECHNOLOGY (BEIJING) CO., LTD., Haidian District Beijing (CN)

(72) Inventors: Yuqiang Zhai, Haidian District Beijing (CN); Tian Xia, Haidian District Beijing (CN); Han Gao, Haidian District Beijing (CN); Ming Li, Haidian District Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 337 days.

(21) Appl. No.: 16/116,591

(22) Filed: Aug. 29, 2018

(65) Prior Publication Data
US 2019/0080186 A1    Mar. 14, 2019

(30) Foreign Application Priority Data
Sep. 12, 2017    (CN) .......................... 201710822106.3

(51) Int. Cl.
*G06K 9/00*    (2006.01)
*G05D 1/00*    (2006.01)
(Continued)

(52) U.S. Cl.
CPC ....... *G06K 9/00825* (2013.01); *G05D 1/0088* (2013.01); *G05D 1/0246* (2013.01);
(Continued)

(58) Field of Classification Search
None
See application file for complete search history.

(56) References Cited

U.S. PATENT DOCUMENTS

2015/0360692 A1* 12/2015 Ferguson ........... G06K 9/00791
   701/23
2016/0306361 A1* 10/2016 Ben Shalom .......... H04N 7/183
(Continued)

FOREIGN PATENT DOCUMENTS

CN    105185140 A    12/2015
CN    105930819 A    9/2016
(Continued)

*Primary Examiner* — Kelly D Williams
(74) *Attorney, Agent, or Firm* — Lando & Anastasi, LLP

(57) ABSTRACT

The method comprises: obtaining a first image collected by a long-focus camera, a second image collected by a short-focus camera, and positioning information and travelling direction of the autonomous vehicle collected by a positioning sensor at a target moment; according to the positioning information and traveling direction of the autonomous vehicle at the target moment, obtaining, from a high-precision map server, location information of traffic lights within a range of preset distance threshold ahead in the traveling direction of the autonomous vehicle at the target moment; recognizing the state of traffic lights at the target moment, according to the location information of the traffic lights at the target moment, and one image of the first image and second image.

18 Claims, 4 Drawing Sheets

(51) Int. Cl.
*G06K 9/32* (2006.01)
*G05D 1/02* (2020.01)
*G06F 16/29* (2019.01)
*G06K 9/20* (2006.01)

(52) U.S. Cl.
CPC ............ *G06F 16/29* (2019.01); *G06K 9/209* (2013.01); *G06K 9/3241* (2013.01); *G05D 2201/0213* (2013.01)

(56) References Cited

U.S. PATENT DOCUMENTS

2019/0061621 A1\* 2/2019 Chae .................. G02B 13/0075
2020/0086791 A1\* 3/2020 Hardy .................... G06T 5/005

FOREIGN PATENT DOCUMENTS

| CN | 106394406 A | 2/2017 |
| KR | 20150114728 A | 10/2015 |

\* cited by examiner

TRAFFIC LIGHT STATE RECOGNIZING METHOD AND APPARATUS, COMPUTER DEVICE AND READABLE MEDIUM

The present application claims the priority of Chinese Patent Application No. 201710822106.3, filed on Sep. 12, 2017, with the title of "Traffic light state recognizing method and apparatus, computer device and readable medium". The disclosure of the above applications is incorporated herein by reference in its entirety.

FIELD OF THE DISCLOSURE

The present disclosure relates to the technical field of computer application, and particularly to a traffic light state recognizing method and apparatus, a computer device and a readable medium.

BACKGROUND OF THE DISCLOSURE

In autonomous driving technology, to ensure safe passage of an autonomous vehicle through an intersection, the autonomous vehicle needs to detect the traffic light state at the intersection in real time, recognize a red light, green light and a yellow light, obtain states of these lights, and then output the states to a later-stage control system in the autonomous vehicle, and the control system sends a pass or stop command according to the state of the lights.

In the prior art, the autonomous vehicle collects images mainly based on a single camera when traffic lights are recognized. The camera collects information in the road ahead, performs traffic light detection and recognition for a total graph of the collected images, and finally outputs a recognition result, namely, a state of lights. In the current scheme, the traffic light recognition based on the single camera cannot address issues in the two aspects: angle of field and effective distance of camera detection. The larger the angle of field is, the smaller image is formed for the same target, and the image detection difficulty is increased; the smaller the angle of field is, the larger image is formed for the same target, and the image detection difficulty becomes lower. However, a caused problem is that the field of vision of the camera is small, and the traffic lights are prone to deviate from the field of vision so that the autonomous vehicle cannot sense the state of traffic lights ahead.

It is known from the above statements that when the current autonomous vehicle recognizes states of the traffic lights based on a single camera, there might exist situations that the focal distance of the camera is shorter, and the viewing angle is larger so that the traffic lights at a far distance are not collected in time, or the focal distance of the camera is longer, and the viewing angle is smaller so that traffic lights which are at a closer distance and deviate from the field of vision of the camera cannot be collected.

SUMMARY OF THE DISCLOSURE

The present disclosure provides a traffic light state recognizing method and apparatus, a computer device and a readable medium, which are used to improve the autonomous vehicle's efficiency in recognizing the state of traffic lights.

The present disclosure provides a traffic light state recognizing method, the method comprising:

obtaining a first image collected by a long-focus camera, a second image collected by a short-focus camera, and positioning information and travelling direction of the autonomous vehicle collected by a positioning sensor at a target moment; the long-focus camera and short-focus camera are respectively disposed on a roof of the autonomous vehicle;

according to the positioning information and traveling direction of the autonomous vehicle at the target moment, obtaining, from a high-precision map server, location information of traffic lights within a range of preset distance threshold ahead in the traveling direction of the autonomous vehicle at the target moment;

recognizing the state of traffic lights at the target moment, according to the location information of the traffic lights at the target moment, and one image of the first image and second image.

Further optionally, in the above method, the obtaining positioning information of the autonomous vehicle collected by a positioning sensor at a target moment specifically comprises:

if it is detected that the positioning sensor does not collect the positioning information of the autonomous vehicle at the target moment, obtaining the positioning information of the autonomous vehicle collected by the positioning sensor at a previous moment and a later moment of the target moment respectively;

calculating the positioning information of the autonomous moment at the target moment in an interpolation manner according to the positioning information of the autonomous vehicle at the previous moment and the later moment of the target moment.

Further optionally, in the method, the step of, according to the positioning information and traveling direction of the autonomous vehicle at the target moment, obtaining, from a high-precision map server, location information of traffic lights within a range of preset distance threshold ahead in the traveling direction of the autonomous vehicle at the target moment specifically comprise:

sending to the high-precision map server a traffic light location request carrying the positioning information and travelling direction of the autonomous vehicle at the target moment, so that the high-precision map server obtains location information of traffic lights within a range of preset distance threshold away from the autonomous vehicle ahead in the traveling direction of the autonomous vehicle, according to the positioning information and traveling direction of the autonomous vehicle in the traffic light location request;

receiving the location information of traffic lights within the range of preset distance threshold ahead in the traveling direction of the autonomous vehicle sent by the high-precision map server.

Further optionally, in the method, the recognizing the state of traffic lights at the target moment, according to the location information of the traffic lights at the target moment, and one image of the first image and second image specifically comprises:

obtaining first location information of the traffic lights at the target moment in the first image according to the location information of the traffic light at the target moment;

judging whether the first location information is valid;

if the first location information is valid, obtaining from the first image a first region of interest for recognizing the state of the traffic lights according to the first location information;

performing detection for the first region of interest to recognize the state of the traffic lights at the target moment.

Further optionally, in the method, if the first location information is invalid, the method further comprises:

obtaining second location information of the traffic lights at the target moment in the second image according to the location information of the traffic lights at the target moment;

obtaining from the second image a second region of interest for recognizing the state of the traffic lights according to the second location information;

performing detection for the second region of interest to recognize the state of the traffic lights at the target moment.

Further optionally, in the method, the obtaining first location information of the traffic lights at the target moment in the first image according to the location information of the traffic light at the target moment specifically comprises:

according to the location information of the traffic lights at the target moment, and in conjunction with an internal parameter of the long-focus camera and an external rotation transformation expression of the long-focus camera relative to the positioning sensor, obtaining the first location information of the traffic lights in the first image using the following equation: $I_{long}=K_l \times [R|T]_l \times P_W$, wherein $I_{long}$ is the first location information of the traffic lights in the first image, $K_l$ is the internal parameter of the long-focus camera, $[R|T]_l$ is the external rotation transformation expression of the long-focus camera relative to the positioning sensor, and $P_W$ is the location information of the traffic lights at the target moment;

the obtaining second location information of the traffic lights at the target moment in the second image according to the location information of the traffic lights at the target moment specifically comprises:

according to the location information of the traffic lights at the target moment, and in conjunction with an internal parameter of the short-focus camera and an external rotation transformation expression of the short-focus camera relative to the positioning sensor, obtaining the second location information of the traffic lights in the second image using the following equation: $I_{short}=K_s \times [R|T]_s \times P_W$, wherein $I_{short}$ is the second location information of the traffic lights in the second image, $K_s$ is the internal parameter of the short-focus camera, $[R|T]_s$ is the external rotation transformation expression of the short-focus camera relative to the positioning sensor, and $P_W$ is the location information of the traffic lights at the target moment.

The present disclosure provides a traffic light state recognizing apparatus, the apparatus comprising:

a basic information obtaining module configured to obtain a first image collected by a long-focus camera, a second image collected by a short-focus camera, and positioning information and travelling direction of the autonomous vehicle collected by a positioning sensor at a target moment; the long-focus camera and short-focus camera are respectively disposed on a roof of the autonomous vehicle;

a location information obtaining module configured to, according to the positioning information and traveling direction of the autonomous vehicle at the target moment, obtain, from a high-precision map server, location information of traffic lights within a range of preset distance threshold ahead in the traveling direction of the autonomous vehicle at the target moment;

a recognizing module configured to recognize the state of traffic lights at the target moment, according to the location information of the traffic lights at the target moment, and one image of the first image and second image.

Further optionally, in the above apparatus, the basic information obtaining module is specifically configured to:

if it is detected that the positioning sensor does not collect the positioning information of the autonomous vehicle at the target moment, obtain the positioning information of the autonomous vehicle collected by the positioning sensor at a previous moment and a later moment of the target moment respectively;

calculate the positioning information of the autonomous moment at the target moment in an interpolation manner according to the positioning information of the autonomous vehicle at the previous moment and the later moment of the target moment.

Further optionally, in the apparatus, the location information obtaining module is specifically configured to:

send to the high-precision map server a traffic light location request carrying the positioning information and travelling direction of the autonomous vehicle at the target moment, so that the high-precision map server obtains location information of traffic lights within a range of preset distance threshold away from the autonomous vehicle ahead in the traveling direction of the autonomous vehicle, according to the positioning information and traveling direction of the autonomous vehicle in the traffic light location request;

receive the location information of traffic lights within the range of preset distance threshold ahead in the traveling direction of the autonomous vehicle sent by the high-precision map server.

Further optionally, in the apparatus, the recognizing module comprises:

a location obtaining unit configured to obtain first location information of the traffic lights at the target moment in the first image according to the location information of the traffic light at the target moment;

a judging unit configured to judge whether the first location information is valid;

a region obtaining unit configured to, if the judging unit judges that the first location information is valid, obtain from the first image a first region of interest for recognizing the state of the traffic lights according to the first location information;

a recognizing unit configured to perform detection for the first region of interest to recognize the state of the traffic lights at the target moment.

Further optionally, in the apparatus, the location obtaining unit is further configured to, if the judging unit judges that the first location information is invalid, obtain second location information of the traffic lights at the target moment in the second image according to the location information of the traffic lights at the target moment;

the region obtaining unit is further configured to obtain from the second image a second region of interest for recognizing the state of the traffic lights according to the second location information;

the recognizing unit is further configured to perform detection for the second region of interest to recognize the state of the traffic lights at the target moment.

Further optionally, in the apparatus, the location obtaining unit is specifically configured to, according to the location information of the traffic lights at the target moment, and in conjunction with an internal parameter of the long-focus camera and an external rotation transformation expression of the long-focus camera relative to the positioning sensor, obtain the first location information of the traffic lights in the first image using the following equation: $I_{long}=K_l \times [R|T]_l \times P_W$, wherein $I_{long}$ is the first location information of the traffic lights in the first image, $K_l$ is the internal parameter of the long-focus camera, $[R|T]_l$ is the external rotation transformation expression of the long-focus camera relative to the positioning sensor, and $P_W$ is the location information of the traffic lights at the target moment;

the location obtaining unit is specifically configured to, according to the location information of the traffic lights at the target moment, and in conjunction with an internal parameter of the short-focus camera and an external rotation transformation expression of the short-focus camera relative to the positioning sensor, obtain the second location information of the traffic lights in the second image using the following equation: $I_{short}=K_s \times [R|T]_S \times P_W$, wherein $I_{short}$ is the second location information of the traffic lights in the second image, $K_s$ is the internal parameter of the short-focus camera, $[R|T]_s$ is the external rotation transformation expression of the short-focus camera relative to the positioning sensor, and $P_W$ is the location information of the traffic lights at the target moment.

The present disclosure further provides a computer device in an autonomous vehicle, the device comprising:
one or more processors;
a storage for storing one or more programs;
the one or more programs, when executed by said one or more processors, enable said one or more processors to implement the above-mentioned traffic light state recognizing method.

The present disclosure further provides a computer readable medium on which a computer program is stored, the program, when executed by a processor, implementing the above-mentioned traffic light state recognizing method.

According to the traffic light state recognizing method and apparatus, the computer device and the readable medium of the present disclosure, it is feasible to, obtain the first image collected by the long-focus camera, the second image collected by the short-focus camera, and positioning information and travelling direction of the autonomous vehicle collected by the positioning sensor at the target moment; according to the positioning information and traveling direction of the autonomous vehicle at the target moment, obtain, from the high-precision map server, location information of traffic lights within a range of preset distance threshold ahead in the traveling direction of the autonomous vehicle at the target moment; recognize the state of traffic lights at the target moment according to the location information of the traffic lights at the target moment, and one image of the first image and second image. As compared with the prior art, the technical solution of the present disclosure can remedy the defect of a lower traffic light state recognition efficiency with a single camera, and achieves the autonomous vehicle's recognition of the state of traffic lights by adaptively switching the long-focus camera and short-focus camera. The technical solution of the present embodiment enables recognition of the state of the traffic lights at any location within a preset distance range ahead in the travelling direction of the autonomous vehicle, and at any moment, and effectively improves the autonomous vehicle's efficiency in recognizing the state of traffic lights.

DETAILED DESCRIPTION OF PREFERRED EMBODIMENTS

The present disclosure will be described in detail with reference to figures and specific embodiments to make objectives, technical solutions and advantages of the present disclosure more apparent.

Figure 1:
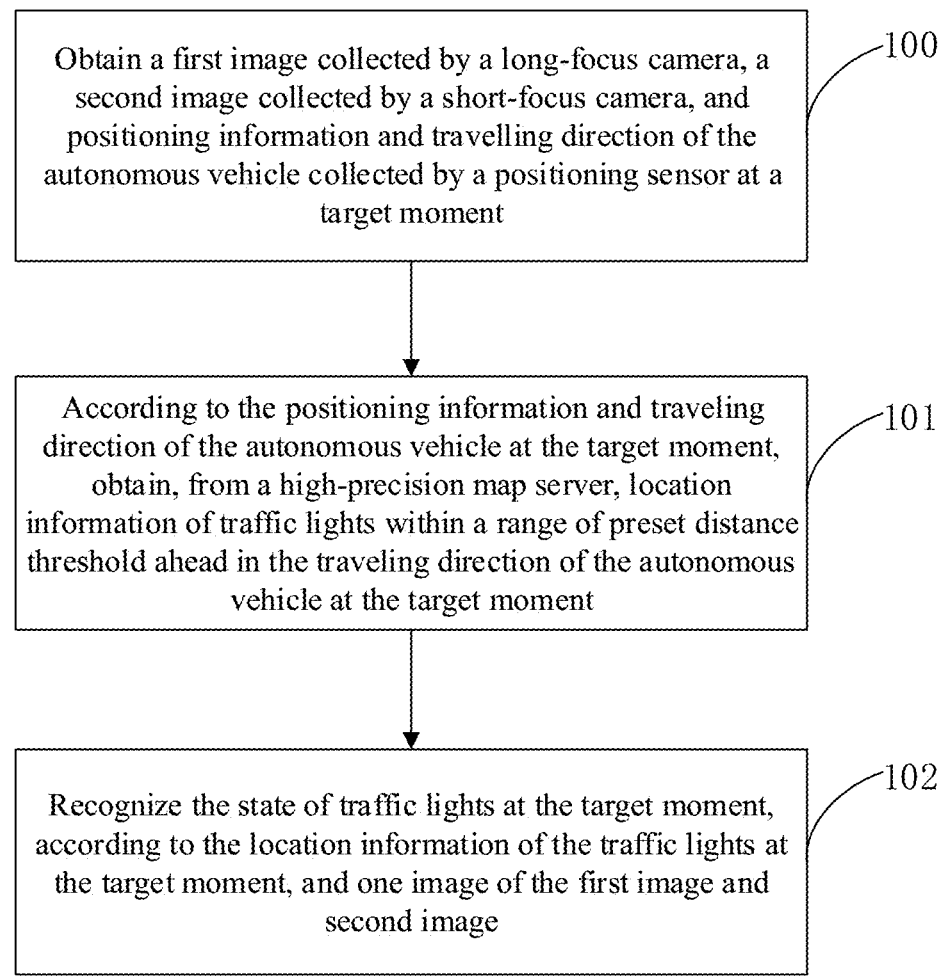
FIG. 1 is a flow chart of an embodiment of a traffic light state recognizing method according to the present disclosure.

FIG. 1 is a flow chart of an embodiment of a traffic light state recognizing method according to the present disclosure. As shown in FIG. 1, the traffic light state recognizing method according to the present embodiment may specifically include the following steps:

100: obtaining a first image collected by a long-focus camera, a second image collected by a short-focus camera, and positioning information and travelling direction of the autonomous vehicle collected by a positioning sensor at a target moment;

A subject for executing the traffic light state recognizing method according to the present embodiment is a traffic light state recognizing apparatus. The traffic light state recognizing apparatus may be disposed in the autonomous vehicle and used to assist the autonomous vehicle in recognizing states of the traffic lights ahead on the travelling road.

Upon implementation of the traffic light state recognizing method according to the present embodiment, it is necessary to dispose two cameras, one long-focus camera and a short-focus camera, on the roof of the autonomous vehicle. For example, the cameras may be specifically disposed in the direction of vehicle head on the roof of the autonomous vehicle to collect road information ahead of the travelling autonomous vehicle, for example, collect traffic lights ahead of the travelling autonomous vehicle. The long-focus camera has a small angle of field, but exhibits a long detection distance, and can see "far"; the short-focus camera has a large angle of field, but exhibits a short detection distance. For example, when the autonomous vehicle is closer to the traffic lights, an optical axis of the long-focus camera does not face the traffic light exactly, and has a larger angle relative to a straight line where a connection line between the traffic lights and the long-focus camera lies. Furthermore, the long-focus camera has a small viewing angle, whereupon the long-focus camera fails to capture the traffic lights; in contrast, the short-focus camera has a large angle of field, and can capture the traffic lights. Adaptive switching is performed using the above characteristics of the long-focus camera and short-focus camera in the present embodiment.

The positioning sensor in the present embodiment may collect positioning information, namely, location information of the autonomous vehicle at any time, and meanwhile may also identify a travelling direction of the autonomous vehicle at any time.

In the present embodiment, to use the first image collected by the long-focus camera, the second image collected by the short-focus camera, and the positioning information and travelling direction of the autonomous vehicle collected by the positioning sensor to together recognize the traffic light states, it is necessary to synchronize the first image collected by the long-focus camera, the second image collected by the short-focus camera, and the positioning information and travelling direction of the autonomous vehicle collected by the positioning sensor according to timestamps. As such, it is feasible to recognize the traffic light states by jointly using the first image collected by the long-focus camera, the second image collected by the short-focus camera, and the positioning information and travelling direction of the autonomous vehicle collected by the positioning sensor at the same time. Upon information storage, it is specifically feasible to set three cyclic queues, for example, store the first image collected by the long-focus camera and a corresponding timestamp in the first cyclic queue in a temporal sequence; store the second image collected by the short-focus camera and a corresponding timestamp in the second cyclic queue in a temporal sequence; store the positioning information and travelling direction of the autonomous vehicle collected by the positioning sensor and a corresponding timestamp in the third cyclic queue in a temporal sequence. In the present embodiment, the three kinds of information may be collected at the same frequency. The collecting frequency may be 5 times per second, or three times per second, six times per second or other frequencies set according to actual needs. For example, a length of each cyclic queue in the present embodiment may be 100, or a length of other values set according to actual needs.

Upon information synchronization, it is feasible to obtain first obtain the first image and second image with the same timestamp from the first cyclic queue and the second cyclic queue respectively, for synchronization. However, if there do not exist the first image and second image with completely the same timestamp, it is possible to look for the first image and second image with the closest timestamps, as the first image and second image with the same timestamp, whereupon the same timestamp may be the timestamp corresponding to the first image, or the timestamp corresponding to the second timestamp.

Then, the positioning information and travelling direction of the autonomous vehicle with the same timestamp is obtained from the third cyclic queue. However, if it is detected that there does not exist the positioning information and travelling direction of the autonomous vehicle with the same timestamp in the third cyclic queue, for example, if the same timestamp is taken as the target moment and if it is detected that the positioning sensor does not collect the positioning information of the autonomous vehicle at the target moment, it is possible to obtain the positioning information of the autonomous vehicle collected by the positioning sensor at a previous moment and a later moment of the target moment respectively; then calculate the positioning information of the autonomous moment at the target moment in an interpolation manner according to the positioning information of the autonomous vehicle at the previous moment and the later moment of the target moment. As such, it is possible to obtain the first image collected by the long-focus camera, the second image collected by the short-focus camera, and the positioning information and travelling direction of the autonomous vehicle collected by the positioning sensor corresponding to the same timestamp. It is feasible to, in the above manner, synchronize three kinds of information at any target moment, and thereby obtain the first image collected by the long-focus camera, the second image collected by the short-focus camera, and the positioning information and travelling direction of the autonomous vehicle collected by the positioning sensor at the same moment.

101: according to the positioning information and travelling direction of the autonomous vehicle at the target moment, obtaining, from a high-precision map server, location information of traffic lights within a range of preset distance threshold ahead in the traveling direction of the autonomous vehicle at the target moment;

The high-precision map is a map with a very high precision. A location of any of the traffic lights may be accurately identified in the high-precision map. The position information of the traffic lights in the high-precision map may be identified using a world coordinate system. Not only longitudinal and latitude coordinates but also a height may be identified. For example, it is feasible to, in the high-precision map, employ a Universal Transverse Mercator (UTM) grid coordinate system to identify coordinates of any point. The UTM coordinate system is also a planar right-angle coordinate system. For particulars, reference may be made to relevant prior art and no detailed description is presented any more. The high-precision map may identify location information of any of the traffic lights based on the UTM coordinates.

In the present embodiment, the state of the traffic lights is recognized mainly to control the autonomous vehicle. If the traffic lights are far away from the current location of the autonomous vehicle, recognizing the state of the traffic lights does not make sense, whereupon it is unnecessary to control the autonomous vehicle according to the state of the traffic lights; furthermore, the long-focus camera and short-focus camera located on the autonomous vehicle cannot collect the state of the traffic lights at a far distance. Therefore, in the present embodiment, it is feasible to set a preset distance threshold, and only obtain, from the high-precision map server, location information of traffic lights within a range of the preset distance threshold ahead in the traveling direction of the autonomous vehicle at the target moment. For example, the preset distance threshold in the present embodiment is specifically set according to the focal distance of the long-focus camera, which may ensure the long-focus camera can collect the traffic lights at the location of the preset distance threshold ahead. The preset distance threshold may be specifically 100 meters, 150 meters or other values set according to the focal distance of the long-focus camera.

For example, step 101 may specifically include the following steps:

(a1) sending to the high-precision map server a traffic light location request carrying the positioning information and travelling direction of the autonomous vehicle at the target moment, so that the high-precision map server obtains location information of traffic lights within a range of preset distance threshold away from the autonomous vehicle ahead in the traveling direction of the autonomous vehicle, according to the positioning information and traveling direction of the autonomous vehicle in the traffic light location request;

(b1) receiving the location information of traffic lights within the range of preset distance threshold ahead in the traveling direction of the autonomous vehicle sent by the high-precision map server.

It needs to be appreciated that the positioning information of the autonomous vehicle collected by the positioning sensor at the target moment in the present embodiment may be location information identified by the UTM coordinate system. As such, after the traffic light state recognizing apparatus sends to the high-precision map server a traffic light location request carrying the positioning information and travelling direction of the autonomous vehicle at the target moment, the high-precision map server may determine the traveling road of the autonomous vehicle according to the positioning information of the autonomous vehicle at the target moment; and then obtain location information of traffic lights within a range of preset distance threshold away from the autonomous vehicle on the traveling road of the autonomous vehicle and ahead in the traveling direction, with reference to the traveling road and traveling direction of the autonomous vehicle. The location information of the traffic lights is location information identified by the UTM coordinate system. Then, the high-precision map server returns the obtained location information of traffic lights within a range of preset distance threshold ahead in the traveling direction of the autonomous vehicle to the traffic light state recognizing apparatus.

It needs to be appreciated that if the high-precision map server detects that the traffic lights do not exist within the range of the preset distance threshold ahead in the traveling direction of the autonomous vehicle, the high-precision map server does not return any information; if the traffic light state recognizing apparatus does not receive any feedback within a preset time period after the traffic light position request is sent, this may indicate that there are no traffic lights within the range of preset distance threshold ahead. At this time, the control system of the autonomous vehicle may not send any instruction of deceleration or stop, and continue to control the autonomous vehicle to advance. Or, if the high-precision map server detects that the traffic lights do not exist within the range of the preset distance threshold ahead in the traveling direction of the autonomous vehicle, it is feasible to set the high-precision map server to return an empty information to advise the traffic light state recognizing apparatus that traffic lights do not exist within the range of the preset distance threshold ahead.

102: according to the location information of the traffic lights at the target moment, and one image of the first image and second image, recognizing the state of traffic lights at the target moment.

It is possible to, after obtaining the location information of the traffic lights at the target moment, know that the image of the traffic lights can be collected in at least one image of the first image collected by the long-focus camera at the target moment and the second image collected by the short-focus camera at the target moment, whereupon it is feasible to analyze the first image collected by the long-focus camera at a current moment and the second image collected by the short-focus camera at the current moment, and recognize the state of the traffic lights. For example, it is feasible to recognize the state of the traffic lights collected at the target moment by analyzing the total graph of the first image or second image. The analyzing total graph here means according to shape features of the traffic lights, looking in the image for a graph conforming to the shape features of traffic lights, and recognizing a color of the graph conforming to the shape features of traffic lights, and thereby recognizing the traffic lights. Since the long-focus camera sees far and can capture the traffic lights ahead in the road, the total graph analysis is preferentially performed for the first image. If the state of traffic lights at the target moment can be recognized according to the first image, the process ends up. Otherwise, if an identifier similar to the traffic lights is not in the first image after the total graph analysis is performed for the first image, the state of the traffic lights at the target moment are not recognized after the total graph analysis is performed for the first image, whereupon it is feasible to continue to perform total graph analysis for the second image and recognize the state of traffic lights at the target moment.

However, the above total graph analysis results in a lower frequency in recognizing the state of the traffic lights. In the present embodiment, the state of the traffic lights can be analyzed more precisely in the first image or second image. For example, the step 102 may specifically comprises the following steps:

(a2) according to the location information of the traffic light at the target moment, obtaining first location information of the traffic lights at the target moment in the first image;

For example, according to the location information of the traffic lights at the target moment, and in conjunction with an internal parameter of the long-focus camera and an external rotation transformation expression of the long-focus camera relative to the positioning sensor, the first location information of the traffic lights in the first image may be obtained using the following equation: $I_{long}=K_l \times [R|T]_l \times P_W$, wherein $I_{long}$ is the first location information of the traffic lights in the first image, $K_l$ is the internal parameter of the long-focus camera, $[R|T]_l$ is the external rotation transformation expression of the long-focus camera relative to the positioning sensor, and $P_W$ is the location information of the traffic lights at the target moment; for example, the location information $P_W$ of the traffic lights at the target moment employs coordinates (x, y, z) identified by the UTM coordinate system, and may be a 3*1-dimensional matrix; the internal parameter of the long-focus camera $K_l$ may also be represented with a matrix; $[R|T]_l$ the external rotation transformation expression of the long-focus camera relative to the positioning sensor may also be represented with a matrix; the finally-obtained $I_{long}$, namely, first location information of the traffic lights in the first image is a 2-dimensional matrix, which respectively represents transverse and longitudinal coordinates of a pixel point of the traffic lights in the first image. It needs to be appreciated that the size of the first image and second image of the present embodiment is pre-known, for example, 1920*1080.

(b2) judging whether the first location information is valid; if yes, performing step (c2); if no, performing step (e2);

In the present embodiment, it is feasible to judge whether the first location information is within a range of the size of the first image, and regard the first location information valid if yes, or regard the first location information invalid if no. For example, it is feasible to set vertexes of the image according to the size 1920*1080 of the image, for example, set coordinates of the pixel at the left upper corner as (0, 0), coordinates of the pixel at the left lower corner as (0, 1080), set coordinates of the pixel at the right upper corner as (1920, 0), and set coordinates of the pixel at the right lower corner as (1920, 1080). If the first location information is not in a scope of a quadrangle formed by the four vertexes, it is determined that the first location information is invalid, otherwise the first location information is valid.

(c2) according to the first location information, obtaining from the first image a first Region Of Interest (ROI) for recognizing the state of the traffic lights; performing step (d2);

(d2) performing detection for the first ROI to recognize the state of the traffic lights at the target moment, and ending the process.

When the first location information is valid, it is not accurate enough to recognize the state of the traffic lights according to one pixel point. At this time, it is possible to, in the first image, take the first location information as a center, and enlarge, towards the periphery, pixels of a preset multiple, for example, enlarge twice, three times or other multiples to obtain the first ROI. The first ROI includes more pixel points relative to the first location information, and includes more thorough images of the traffic lights, thereby more accurately recognizing the state of the traffic lights. Finally, it is feasible to perform detection for the first ROI, for example, detect whether the color of the first ROI is red, green or yellow, according to pixel values of red, green or yellow, thereby implementing recognition for the state of the traffic lights at the target moment.

(e2) according to the location information of the traffic lights at the target moment, obtaining second location information of the traffic lights at the target moment in the second image; performing step (f2);

Likewise, according to the location information of the traffic lights at the target moment, and in conjunction with an internal parameter of the short-focus camera and an external rotation transformation expression of the short-focus camera relative to the positioning sensor, the second location information of the traffic lights in the second image may be obtained using the following equation: $I_{short}=K_s \times [R|T]_S \times P_W$, wherein $I_{short}$ is the second location information of the traffic lights in the second image, $K_s$ is the internal parameter of the short-focus camera, $[R|T]_s$ is the external rotation transformation expression of the short-focus camera relative to the positioning sensor, and $P_W$ is the location information of the traffic lights at the target moment. Likewise, the location information $P_W$ of the traffic lights at the target moment employs coordinates (x, y, z) identified by the UTM coordinate system, and may be a 3*1-dimensional matrix; the internal parameter of the short-focus camera $K_s$ may also be represented with a matrix; $[R|T]_s$ the external rotation transformation expression of the short-focus camera relative to the positioning sensor may also be represented with a matrix; the finally-obtained $I_{short}$, namely, second location information of the traffic lights in the second image is a 2-dimensional matrix, which respectively represents transverse and longitudinal coordinates of a pixel point of the traffic lights in the second image.

(f2) according to the second location information, obtaining from the second image a second ROI for recognizing the state of the traffic lights; performing step (g2);

(g2) performing detection for the second ROI to recognize the state of the traffic lights at the target moment.

Specific implementation modes of the steps (f2) and (g2) are the same as the implementation principles of the above steps (c2) and (d2). For details, please refer to the depictions of the above relevant steps, and detailed description will not be presented any more.

According to the above solution, it is feasible to recognize the state of the traffic lights at the target moment by performing detection for the first ROI or second ROI without performing full graph detection for the first image or second image, greatly reducing the image processing region, recognizing more accurately, effectively reducing time spent in recognition, and further improving the efficiency in recognizing the state of the traffic lights.

In the present embodiment, the long-focus camera detects a long distance and can see farther, whereas the short-focus camera detects a short distance. When the traffic lights are farther away from the autonomous vehicle, the long-focus camera may collect information of the traffic lights, and the short-focus camera fails to collect information of the traffic lights, whereupon the state of the traffic lights at the target moment can be recognized according to the first image collected by the long-focus camera. As the autonomous vehicle advances and get closer to the traffic lights, both the long-focus camera and short-focus camera can collect the information of the traffic lights. However, at this time, the first image collected by the long-focus camera is still preferably employed to recognize the state of the traffic lights at the target moment. When the autonomous vehicle travels to the traffic lights close enough, the optical axis of the long-focus camera does not face exactly the traffic lights, and the straight line where a connection line of the traffic lights and the long-focus camera lies has a larger angle. Since the long-focus camera has a small viewing angle, the long-focus camera cannot collect the traffic lights at this time, whereas the angle of field of the short-focus camera is large and can capture the traffic lights. At this time, adaptive switching is performed to a case in which the state of the traffic lights at the target moment is recognized according to the second image collected by the short-focus camera. As such, it is possible to ensure recognition of the state of the traffic lights at any moment, and effectively improve the efficiency of recognizing the state of the traffic lights.

The traffic light state recognizing method according to the present embodiment comprises obtaining the first image collected by the long-focus camera, the second image collected by the short-focus camera, and positioning information and travelling direction of the autonomous vehicle collected by the positioning sensor at the target moment; according to the positioning information and traveling direction of the autonomous vehicle at the target moment, obtaining, from the high-precision map server, location information of traffic lights within a range of preset distance threshold ahead in the traveling direction of the autonomous vehicle at the target moment; according to the location information of the traffic lights at the target moment, and one image of the first image and second image, recognizing the state of traffic lights at the target moment. As compared with the prior art, the traffic light state recognizing method according to the present embodiment can remedy the defect of a lower traffic light state recognition efficiency with a single camera, and achieves the autonomous vehicle's recognition of the state of traffic lights by adaptively switching the long-focus camera and short-focus camera. The technical solution of the present embodiment enables recognition of the state of the traffic lights at any location within a preset distance range ahead in the travelling direction of the autonomous vehicle, and at any moment, and effectively improves the autonomous vehicle's efficiency in recognizing the state of traffic lights.

Figure 2:
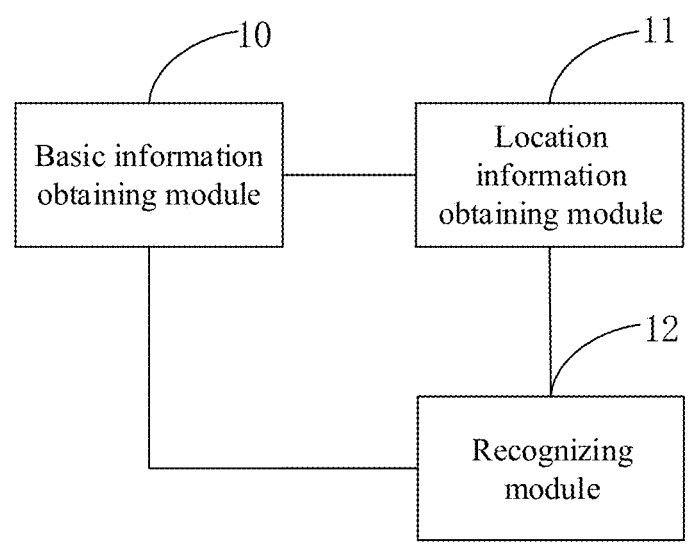
FIG. 2 is a structural diagram of Embodiment 1 of a traffic light state recognizing apparatus according to the present disclosure.

FIG. 2 is a structural diagram of Embodiment 1 of a traffic light state recognizing apparatus according to the present disclosure. As shown in FIG. 2, the traffic light state recognizing apparatus according to the present embodiment may specifically comprise: a basic information obtaining module 10, a location information obtaining module 11 and a recognizing module 12.

Wherein the basic information obtaining module 10 is configured to obtain a first image collected by a long-focus camera, a second image collected by a short-focus camera, and positioning information and travelling direction of the autonomous vehicle collected by a positioning sensor at a target moment; the long-focus camera and short-focus camera are respectively disposed on a roof of the autonomous vehicle;

the location information obtaining module 11 is configured to, according to the positioning information and traveling direction of the autonomous vehicle at the target moment obtained by the basic information obtaining module 10, obtain, from a high-precision map server, location information of traffic lights within a range of preset distance threshold ahead in the traveling direction of the autonomous vehicle at the target moment;

the recognizing module 12 is configured to recognize the state of traffic lights at the target moment, according to the location information of the traffic lights at the target moment obtained by the location information obtaining module 11, and one image of the first image and second image obtained by the basic information obtaining module 10.

Principles employed by the traffic light state recognizing apparatus according to the present embodiment to implement recognition of the state of the traffic lights with the above modules and the resultant technical effects are the same as those of the above-mentioned method embodiments. For particulars, please refer to the depictions of the aforesaid relevant method embodiments, and no detailed depictions will be presented here.

Figure 3:
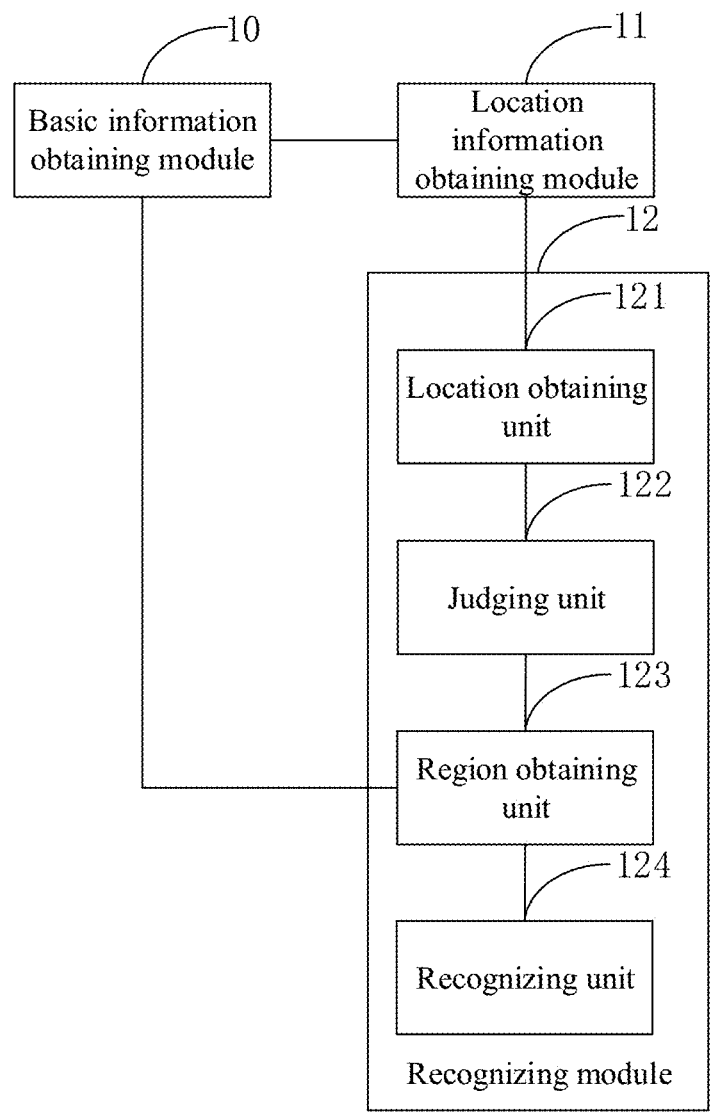
FIG. 3 is a structural diagram of Embodiment 2 of a traffic light state recognizing apparatus according to the present disclosure.

FIG. 3 is a structural diagram of Embodiment 2 of a traffic light state recognizing apparatus according to the present disclosure. The recognition of the state of the traffic lights in the present embodiment further introduces the technical solution of the present disclosure in more detail on the basis of the technical solution of the embodiment shown in FIG. 2.

In the traffic light state recognizing apparatus according to the present embodiment, the basic information obtaining module 10 is specifically configured to:

if it is detected that the positioning sensor does not collect the positioning information of the autonomous vehicle at the target moment, obtain the positioning information of the autonomous vehicle collected by the positioning sensor at a previous moment and a later moment of the target moment respectively;

calculate the positioning information of the autonomous moment at the target moment in an interpolation manner according to the positioning information of the autonomous vehicle at the previous moment and the later moment of the target moment.

Further optionally, in the traffic light state recognizing apparatus according to the present embodiment, the location information obtaining module 11 is specifically configured to:

send to the high-precision map server a traffic light location request carrying the positioning information and travelling direction of the autonomous vehicle at the target moment obtained by the basic information obtaining module 10, so that the high-precision map server obtains location information of traffic lights within a range of preset distance threshold away from the autonomous vehicle ahead in the traveling direction of the autonomous vehicle, according to the positioning information and traveling direction of the autonomous vehicle in the traffic light location request;

receive the location information of traffic lights within the range of preset distance threshold ahead in the traveling direction of the autonomous vehicle sent by the high-precision map server.

Further optionally, as shown in FIG. 3, in the traffic light state recognizing apparatus according to the present embodiment, the recognizing module 12 comprises:

a location obtaining unit 121 configured to obtain first location information of the traffic lights at the target moment in the first image, according to the location information of the traffic light at the target moment obtained by the location information obtaining module 11;

a judging unit 122 configured to judge whether the first location information obtained by the location obtaining unit 121 is valid;

a region obtaining unit 123 configured to, if the judging unit 122 judges that the first location information is valid, obtain from the first image obtained by the basic information obtaining unit 10 a first ROI for recognizing the state of the traffic lights, according to the first location information obtained by the location obtaining unit 121;

a recognizing unit 124 configured to perform detection for the first ROI obtained by the region obtaining unit 123 to recognize the state of the traffic lights at the target moment.

Further optionally, in the traffic light state recognizing apparatus according to the present embodiment, the location obtaining unit 121 is further configured to, if the judging unit 122 judges that the first location information is invalid, obtain second location information of the traffic lights at the target moment in the second image according to the location information of the traffic lights at the target moment;

the region obtaining unit 123 is further configured to, according to the second location information obtained by the location obtaining unit 121, obtain from the second image obtained by the basic information obtaining module 10 a second ROI for recognizing the state of the traffic lights;

the recognizing unit 124 is further configured to perform detection for the second ROI obtained by the region obtaining unit 123 to recognize the state of the traffic lights at the target moment.

Further optionally, in the traffic light state recognizing apparatus according to the present embodiment, the location obtaining unit 121 is specifically configured to, according to the location information of the traffic lights at the target moment, and in conjunction with an internal parameter of the long-focus camera and an external rotation transformation expression of the long-focus camera relative to the positioning sensor, obtain the first location information of the traffic lights in the first image using the following equation: $I_{long}=K_l \times [R|T]_l \times P_W$, wherein $I_{long}$ is the first location information of the traffic lights in the first image, $K_l$ is the internal parameter of the long-focus camera, $[R|T]_l$ is the external rotation transformation expression of the long-focus camera relative to the positioning sensor, and $P_W$ is the location information of the traffic lights at the target moment;

The location obtaining unit 121 is specifically configured to, according to the location information of the traffic lights at the target moment, and in conjunction with an internal parameter of the short-focus camera and an external rotation transformation expression of the short-focus camera relative to the positioning sensor, obtain the second location information of the traffic lights in the second image using the following equation: $I_{short}=K_s \times [R|T]_s \times P_W$, wherein $I_{short}$ is the second location information of the traffic lights in the second image, $K_s$ is the internal parameter of the short-focus camera, $[R|T]_s$ is the external rotation transformation expression of the short-focus camera relative to the positioning sensor, and $P_W$ is the location information of the traffic lights at the target moment.

Principles employed by the traffic light state recognizing apparatus according to the present embodiment to implement recognition of the state of the traffic lights with the above modules and the resultant technical effects are the same as those of the above-mentioned method embodiments. For particulars, please refer to the depictions of the aforesaid relevant method embodiments, and no detailed depictions will be presented here.

Figure 4:
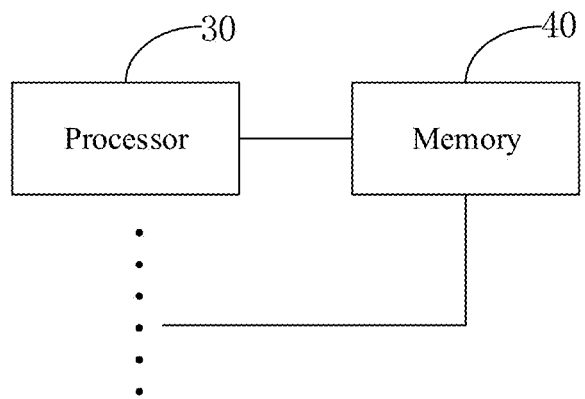
FIG. 4 is a block diagram of an embodiment of a computer device for an autonomous vehicle according to the present disclosure.

FIG. 4 is a structural diagram of an embodiment of a computer device for the autonomous vehicle according to the present disclosure. As shown in FIG. 4, the computer device for the autonomous vehicle according to the present embodiment comprises: one or more processors 30, and a memory 40 for storing one or more programs; the one or more programs stored in the memory 40, when executed by said one or more processors 30, enable said one or more processors 30 to implement recognition of the state of the traffic lights in the embodiment shown in FIG. 1. In the embodiment shown in FIG. 4, an example is taken in which the computer device comprises a plurality of processors 30. A multi-functional computer device is disposed in the autonomous vehicle to achieve detection of the environment, and sending and execution of a command, thereby achieving the travel of the autonomous vehicle. The computer device in the autonomous vehicle of the present embodiment mainly involves the recognition of the state of the traffic lights ahead in the traveling direction of the autonomous vehicle.

Figure 5:
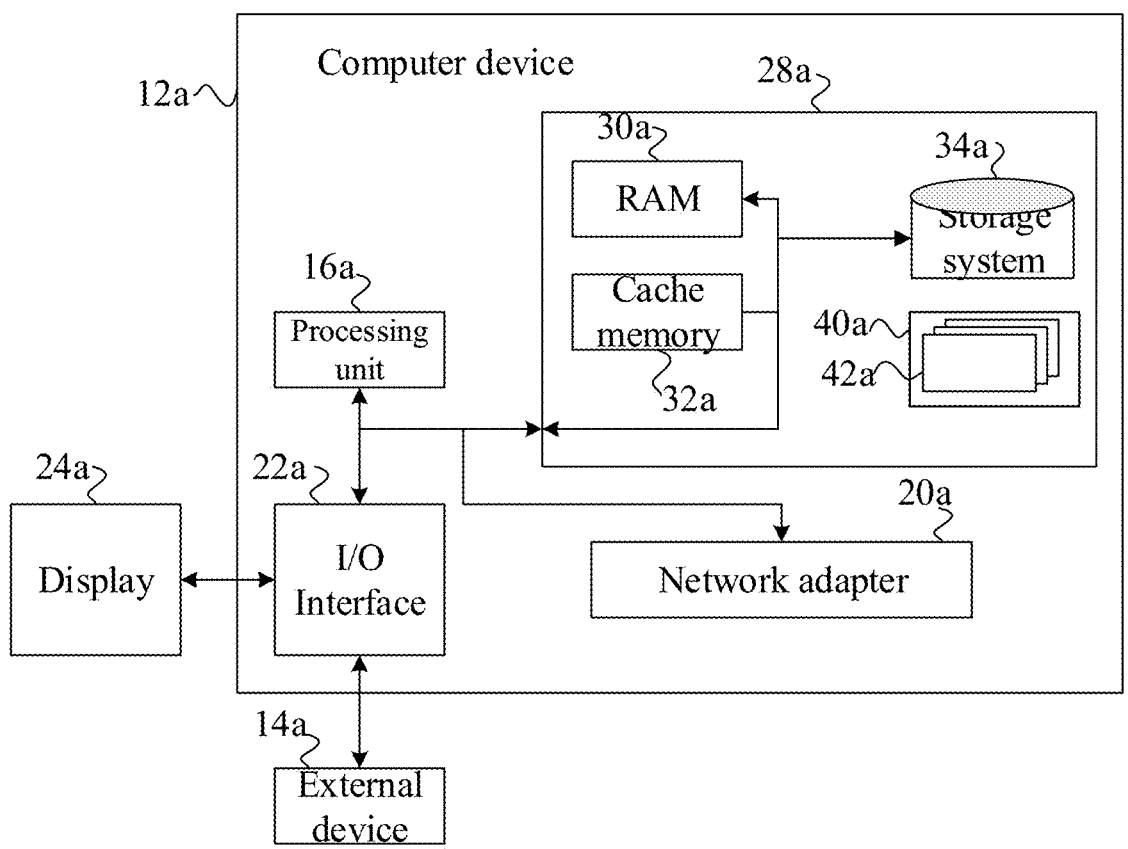
FIG. 5 is an example diagram of a computer device for the autonomous vehicle according to the present disclosure.

For example, FIG. 5 is an example diagram of a computer device for the autonomous vehicle according to an embodiment of the present disclosure. FIG. 5 shows a block diagram of an example computer device 12a of the autonomous vehicle adapted to implement an implementation mode of the present disclosure. The computer device 12a shown in FIG. 5 is only an example and should not bring about any limitation to the function and scope of use of the embodiments of the present disclosure.

As shown in FIG. 5, the computer device 12a of the autonomous vehicle is shown in the form of a general-purpose computing device. The components of computer device 12a of the autonomous vehicle may include, but are not limited to, one or more processors 16a, a system memory 28a, and a bus 18a that couples various system components including the system memory 28a and the processors 16a.

Bus 18a represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 12a of the autonomous vehicle typically includes a variety of computer system readable media. Such media may be any available media that is accessible by computer device 12a of the autonomous vehicle, and it includes both volatile and non-volatile media, removable and non-removable media.

The system memory 28a can include computer system readable media in the form of volatile memory, such as random access memory (RAM) 30a and/or cache memory 32a. Computer device 12a of the autonomous vehicle may further include other removable/non-removable, volatile/non-volatile computer system storage media. By way of example only, storage system 34a can be provided for reading from and writing to a non-removable, non-volatile magnetic media (not shown in FIG. 5 and typically called a "hard drive"). Although not shown in FIG. 5, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18a by one or more data media interfaces. The system memory 28a may include at least one program product having a set (e.g., at least one) of program modules that are configured to carry out the functions of embodiments shown in FIG. 1-FIG. 3 of the present disclosure.

Program/utility 40a, having a set (at least one) of program modules 42a, may be stored in the system memory 28a by way of example, and not limitation, as well as an operating system, one or more disclosure programs, other program modules, and program data. Each of these examples or a certain combination thereof might include an implementation of a networking environment. Program modules 42a generally carry out the functions and/or methodologies of embodiments shown in FIG. 1-FIG. 3 of the present disclosure.

Computer device 12a of the autonomous vehicle may also communicate with one or more external devices 14a such as a keyboard, a pointing device, a display 24a, etc.; with one or more devices that enable a user to interact with computer device 12a; and/or with any devices (e.g., network card, modem, etc.) that enable computer device 12a of the autonomous vehicle to communicate with one or more other computing devices. Such communication can occur via Input/Output (I/O) interfaces 22a. Still yet, computer device 12a of the autonomous vehicle can communicate with one or more networks such as a local area network (LAN), a general wide area network (WAN), and/or a public network (e.g., the Internet) via network adapter 20a. As depicted in FIG. 5, network adapter 20a communicates with the other communication modules of computer device 12a of the autonomous vehicle via bus 18a. It should be understood that although not shown, other hardware and/or software modules could be used in conjunction with computer device 12a of the autonomous vehicle. Examples, include, but are not limited to: microcode, device drivers, redundant processing units, external disk drive arrays, RAID systems, tape drives, and data archival storage systems, etc.

The processor 16a executes various function applications and data processing by running programs stored in the system memory 28a, for example, implements the traffic light state recognizing method shown in the above embodiments.

The present disclosure further provides a computer readable medium on which a computer program is stored, the program, when executed by a processor, implementing the traffic light state recognizing method shown in the above embodiments.

The computer readable medium of the present embodiment may include RAM30a, and/or cache memory 32a and/or a storage system 34a in the system memory 28a in the embodiment shown in FIG. 5.

As science and technology develops, a propagation channel of the computer program is no longer limited to tangible medium, and it may also be directly downloaded from the network or obtained in other manners. Therefore, the computer readable medium in the present embodiment may include a tangible medium as well as an intangible medium.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A traffic light state recognizing method, wherein the method comprises:
    obtaining a first image collected by a long-focus camera, a second image collected by a short-focus camera, and positioning information and travelling direction of the autonomous vehicle collected by a positioning sensor at a target moment; the long-focus camera and short-focus camera are respectively disposed on a roof of the autonomous vehicle;
    according to the positioning information and traveling direction of the autonomous vehicle at the target moment, obtaining, from a high-precision map server, location information of traffic lights within a range of preset distance threshold ahead in the traveling direction of the autonomous vehicle at the target moment;
    recognizing the state of the traffic lights at the target moment, according to the location information of the traffic lights at the target moment, and one image of the first image and second image, wherein the second image is used for recognizing the state of the traffic lights in a situation where the state of the traffic lights is not recognized using the first image.

2. The method according to claim 1, wherein the obtaining positioning information of the autonomous vehicle collected by a positioning sensor at a target moment specifically comprises:
    if it is detected that the positioning sensor does not collect the positioning information of the autonomous vehicle at the target moment, obtaining the positioning information of the autonomous vehicle collected by the positioning sensor at a previous moment and a later moment of the target moment respectively;
    calculating the positioning information of the autonomous vehicle at the target moment in an interpolation manner according to the positioning information of the autonomous vehicle at the previous moment and the later moment of the target moment.

3. The method according to claim 1, wherein the step of, according to the positioning information and traveling direction of the autonomous vehicle at the target moment, obtaining, from a high-precision map server, location information of traffic lights within a range of preset distance threshold ahead in the traveling direction of the autonomous vehicle at the target moment specifically comprises:
    sending to the high-precision map server a traffic light location request carrying the positioning information and travelling direction of the autonomous vehicle at the target moment, so that the high-precision map server obtains location information of traffic lights within a range of preset distance threshold away from the autonomous vehicle ahead in the traveling direction of the autonomous vehicle, according to the positioning information and traveling direction of the autonomous vehicle in the traffic light location request;
    receiving the location information of traffic lights within the range of preset distance threshold ahead in the traveling direction of the autonomous vehicle sent by the high-precision map server.

4. The method according to claim 1, wherein the recognizing the state of traffic lights at the target moment, according to the location information of the traffic lights at the target moment, and one image of the first image and second image specifically comprises:
   obtaining first location information of the traffic lights at the target moment in the first image according to the location information of the traffic light at the target moment;
   judging whether the first location information is valid;
   if the first location information is valid, obtaining from the first image a first region of interest for recognizing the state of the traffic lights according to the first location information;
   performing detection for the first region of interest to recognize the state of the traffic lights at the target moment.

5. The method according to claim 4, wherein if the first location information is invalid, the method further comprises:
   obtaining second location information of the traffic lights at the target moment in the second image according to the location information of the traffic lights at the target moment;
   obtaining from the second image a second region of interest for recognizing the state of the traffic lights according to the second location information;
   performing detection for the second region of interest to recognize the state of the traffic lights at the target moment.

6. The method according to claim 5, wherein the obtaining first location information of the traffic lights at the target moment in the first image according to the location information of the traffic light at the target moment specifically comprises:
   according to the location information of the traffic lights at the target moment, and in conjunction with an internal parameter of the long-focus camera and an external rotation transformation expression of the long-focus camera relative to the positioning sensor, obtaining the first location information of the traffic lights in the first image using the following equation: $I_{long} = K_l \times [R|T]_l \times P_W$, wherein $I_{long}$ is the first location information of the traffic lights in the first image, $K_l$ is the internal parameter of the long-focus camera, $[R|T]_l$ is the external rotation transformation expression of the long-focus camera relative to the positioning sensor, and $P_W$ is the location information of the traffic lights at the target moment;
   the obtaining second location information of the traffic lights at the target moment in the second image according to the location information of the traffic lights at the target moment specifically comprises:
   according to the location information of the traffic lights at the target moment, and in conjunction with an internal parameter of the short-focus camera and an external rotation transformation expression of the short-focus camera relative to the positioning sensor, obtaining the second location information of the traffic lights in the second image using the following equation: $I_{short} = K_s \times [R|T]_s \times P_W$, wherein $I_{short}$ is the second location information of the traffic lights in the second image, $K_s$ is the internal parameter of the short-focus camera, $[R|T]_s$ is the external rotation transformation expression of the short-focus camera relative to the positioning sensor, and $P_W$ is the location information of the traffic lights at the target moment.

7. A computer device for an autonomous vehicle, wherein the device comprises:
   one or more processors;
   a storage for storing one or more programs;
   the one or more programs, when executed by said one or more processors, enable said one or more processors to implement a traffic light state recognizing method, wherein the method comprises:
   obtaining a first image collected by a long-focus camera, a second image collected by a short-focus camera, and positioning information and travelling direction of the autonomous vehicle collected by a positioning sensor at a target moment; the long-focus camera and short-focus camera are respectively disposed on a roof of the autonomous vehicle;
   according to the positioning information and traveling direction of the autonomous vehicle at the target moment, obtaining, from a high-precision map server, location information of traffic lights within a range of preset distance threshold ahead in the traveling direction of the autonomous vehicle at the target moment;
   recognizing the state of the traffic lights at the target moment, according to the location information of the traffic lights at the target moment, and one image of the first image and second image, wherein the second image is used for recognizing the state of the traffic lights in a situation where the state of the traffic lights is not recognized using the first image.

8. The computer device according to claim 7, wherein the obtaining positioning information of the autonomous vehicle collected by a positioning sensor at a target moment specifically comprises:
   if it is detected that the positioning sensor does not collect the positioning information of the autonomous vehicle at the target moment, obtaining the positioning information of the autonomous vehicle collected by the positioning sensor at a previous moment and a later moment of the target moment respectively;
   calculating the positioning information of the autonomous vehicle at the target moment in an interpolation manner according to the positioning information of the autonomous vehicle at the previous moment and the later moment of the target moment.

9. The computer device according to claim 7, wherein the step of, according to the positioning information and traveling direction of the autonomous vehicle at the target moment, obtaining, from a high-precision map server, location information of traffic lights within a range of preset distance threshold ahead in the traveling direction of the autonomous vehicle at the target moment specifically comprises:
   sending to the high-precision map server a traffic light location request carrying the positioning information and travelling direction of the autonomous vehicle at the target moment, so that the high-precision map server obtains location information of traffic lights within a range of preset distance threshold away from the autonomous vehicle ahead in the traveling direction of the autonomous vehicle, according to the positioning information and traveling direction of the autonomous vehicle in the traffic light location request;
   receiving the location information of traffic lights within the range of preset distance threshold ahead in the traveling direction of the autonomous vehicle sent by the high-precision map server.

10. The computer device according to claim 7, wherein the recognizing the state of traffic lights at the target moment, according to the location information of the traffic lights at the target moment, and one image of the first image and second image specifically comprises:
  obtaining first location information of the traffic lights at the target moment in the first image according to the location information of the traffic light at the target moment;
  judging whether the first location information is valid;
  if the first location information is valid, obtaining from the first image a first region of interest for recognizing the state of the traffic lights according to the first location information;
  performing detection for the first region of interest to recognize the state of the traffic lights at the target moment.

11. The computer device according to claim 10, wherein if the first location information is invalid, the method further comprises:
  obtaining second location information of the traffic lights at the target moment in the second image according to the location information of the traffic lights at the target moment;
  obtaining from the second image a second region of interest for recognizing the state of the traffic lights according to the second location information;
  performing detection for the second region of interest to recognize the state of the traffic lights at the target moment.

12. The computer device according to claim 11, wherein the obtaining first location information of the traffic lights at the target moment in the first image according to the location information of the traffic light at the target moment specifically comprises:
  according to the location information of the traffic lights at the target moment, and in conjunction with an internal parameter of the long-focus camera and an external rotation transformation expression of the long-focus camera relative to the positioning sensor, obtaining the first location information of the traffic lights in the first image using the following equation: $I_{long}=K_l \times [R|T]_l \times P_W$, wherein $I_{long}$ is the first location information of the traffic lights in the first image, $K_l$ is the internal parameter of the long-focus camera, $[R|T]_l$ is the external rotation transformation expression of the long-focus camera relative to the positioning sensor, and $P_W$ is the location information of the traffic lights at the target moment;
  the obtaining second location information of the traffic lights at the target moment in the second image according to the location information of the traffic lights at the target moment specifically comprises:
  according to the location information of the traffic lights at the target moment, and in conjunction with an internal parameter of the short-focus camera and an external rotation transformation expression of the short-focus camera relative to the positioning sensor, obtaining the second location information of the traffic lights in the second image using the following equation: $I_{short}=K_s \times [R|T]_s \times P_W$, wherein $I_{short}$ is the second location information of the traffic lights in the second image, $K_s$ is the internal parameter of the short-focus camera, $[R|T]_s$ is the external rotation transformation expression of the short-focus camera relative to the positioning sensor, and $P_W$ is the location information of the traffic lights at the target moment.

13. A non-transitory computer readable medium on which a computer program is stored, wherein the program, when executed by a processor, implements a traffic light state recognizing method, wherein the method comprises:
  obtaining a first image collected by a long-focus camera, a second image collected by a short-focus camera, and positioning information and travelling direction of the autonomous vehicle collected by a positioning sensor at a target moment; the long-focus camera and short-focus camera are respectively disposed on a roof of the autonomous vehicle;
  according to the positioning information and traveling direction of the autonomous vehicle at the target moment, obtaining, from a high-precision map server, location information of traffic lights within a range of preset distance threshold ahead in the traveling direction of the autonomous vehicle at the target moment;
  recognizing the state of the traffic lights at the target moment, according to the location information of the traffic lights at the target moment, and one image of the first image and second image, wherein the second image is used for recognizing the state of the traffic lights in a situation where the state of the traffic lights is not recognized using the first image.

14. The non-transitory computer readable medium according to claim 13, wherein the obtaining positioning information of the autonomous vehicle collected by a positioning sensor at a target moment specifically comprises:
  if it is detected that the positioning sensor does not collect the positioning information of the autonomous vehicle at the target moment, obtaining the positioning information of the autonomous vehicle collected by the positioning sensor at a previous moment and a later moment of the target moment respectively;
  calculating the positioning information of the autonomous vehicle at the target moment in an interpolation manner according to the positioning information of the autonomous vehicle at the previous moment and the later moment of the target moment.

15. The non-transitory computer readable medium according to claim 13, wherein the step of, according to the positioning information and traveling direction of the autonomous vehicle at the target moment, obtaining, from a high-precision map server, location information of traffic lights within a range of preset distance threshold ahead in the traveling direction of the autonomous vehicle at the target moment specifically comprises:
  sending to the high-precision map server a traffic light location request carrying the positioning information and travelling direction of the autonomous vehicle at the target moment, so that the high-precision map server obtains location information of traffic lights within a range of preset distance threshold away from the autonomous vehicle ahead in the traveling direction of the autonomous vehicle, according to the positioning information and traveling direction of the autonomous vehicle in the traffic light location request;
  receiving the location information of traffic lights within the range of preset distance threshold ahead in the traveling direction of the autonomous vehicle sent by the high-precision map server.

16. The non-transitory computer readable medium according to claim 13, wherein the recognizing the state of traffic lights at the target moment, according to the location information of the traffic lights at the target moment, and one image of the first image and second image specifically comprises:

obtaining first location information of the traffic lights at the target moment in the first image according to the location information of the traffic light at the target moment;

judging whether the first location information is valid;

if the first location information is valid, obtaining from the first image a first region of interest for recognizing the state of the traffic lights according to the first location information;

performing detection for the first region of interest to recognize the state of the traffic lights at the target moment.

17. The non-transitory computer readable medium according to claim 16, wherein if the first location information is invalid, the method further comprises:

obtaining second location information of the traffic lights at the target moment in the second image according to the location information of the traffic lights at the target moment;

obtaining from the second image a second region of interest for recognizing the state of the traffic lights according to the second location information;

performing detection for the second region of interest to recognize the state of the traffic lights at the target moment.

18. The non-transitory computer readable medium according to claim 17, wherein the obtaining first location information of the traffic lights at the target moment in the first image according to the location information of the traffic light at the target moment specifically comprises:

according to the location information of the traffic lights at the target moment, and in conjunction with an internal parameter of the long-focus camera and an external rotation transformation expression of the long-focus camera relative to the positioning sensor, obtaining the first location information of the traffic lights in the first image using the following equation: $I_{long}=K_l \times [R|T]_l \times P_W$, wherein $I_{long}$ is the first location information of the traffic lights in the first image, $K_l$ is the internal parameter of the long-focus camera, $[R|T]_l$ is the external rotation transformation expression of the long-focus camera relative to the positioning sensor, and $P_W$ is the location information of the traffic lights at the target moment;

the obtaining second location information of the traffic lights at the target moment in the second image according to the location information of the traffic lights at the target moment specifically comprises:

according to the location information of the traffic lights at the target moment, and in conjunction with an internal parameter of the short-focus camera and an external rotation transformation expression of the short-focus camera relative to the positioning sensor, obtaining the second location information of the traffic lights in the second image using the following equation: $I_{short}=K_s \times [R|T]_s \times P_W$, wherein $I_{short}$ is the second location information of the traffic lights in the second image, $K_s$ is the internal parameter of the short-focus camera, $[R|T]_s$ is the external rotation transformation expression of the short-focus camera relative to the positioning sensor, and $P_W$ is the location information of the traffic lights at the target moment.

* * * * *